Oct. 13, 1964   M. W. POL JANIC, JR   3,152,627
EGG SHELL CUTTER
Filed Aug. 31, 1962

INVENTOR.
MATTHEW W. POL JANIC, JR.
BY
McMorrow, Berman & Davidson
ATTORNEYS.

3,152,627
EGG SHELL CUTTER
Matthew W. Pol Janic, Jr., 140 65th St.,
West New York, N.J.
Filed Aug. 31, 1962, Ser. No. 220,645
4 Claims. (Cl. 146—2)

This invention relates to a novel egg shell cutter.

The primary object of the invention is the provision of a more efficient, practical, and easily used device of the kind indicated, which eliminates the unsanitary and otherwise objectionable practice of cracking egg shells by striking the same against a hard surface or employing the various presently used devices for this purpose, by providing for accurately cutting an arc of substantially 120 degrees through the waist of the egg shell, without otherwise mashing or breaking the shell, so that the shell can then be accurately broken into two equal sections by hand, without spilling the contents of the sections, or, if desired, the cut shell and its contents can be placed aside for future use, without spillage of the contents thereof.

Another object of the invention is the provision of an uncomplex easily cleaned device of the character indicated above, which is composed of a small number of simple and easily assembled parts, which, except for the cutter blade, can be manufactured in well-finished and durable form plastic or other desirable light-weight material.

Other important objects and advantageous features of the invention will be apparent from the following description and the accompanying drawings, wherein, for purposes of illustration only, a specific form of the invention is set forth in detail.

Referring in detail to the drawings, wherein like numerals designate like parts throughout the several views, the illustrated device comprises an elongated handle 10, which can involve a flat bar 12, onto which a plastic hand-grip 14 can be molded, which encloses the bar 12 and is spaced from its ends.

A rectangular block 16 is fixed to the forward end of the handle 10, extends therebelow, and is disposed at an angle to the handle, and with the rear end of the handle, provides a two-point support for the device, upon any convenient surface, when not in use.

Figure 1:
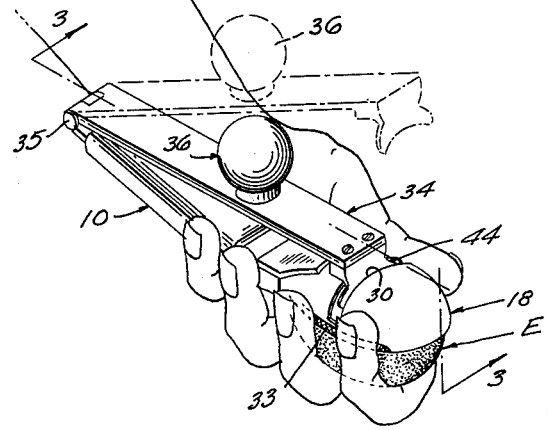
FIGURE 1 is a schematic perspective view showing a device of the invention in use, with the device and an egg to be cut held in the hand of a user, the cutter being shown in cutting position, in full lines, and in elevated inoperative position, in phantom lines.
Figures 2, 3:
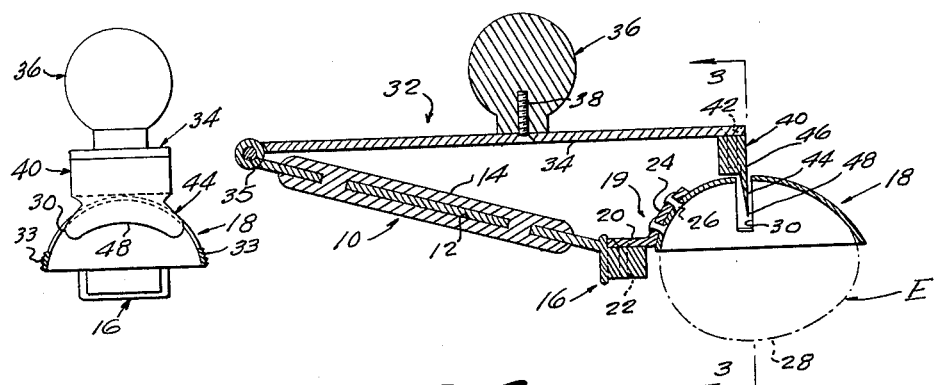
FIGURE 2 is an enlarged vertical longitudinal section taken on the line 3—3 of FIGURE 1.
FIGURE 3 is a transverse vertical section taken on the line 3—3 of FIGURE 2.
Figure 4:
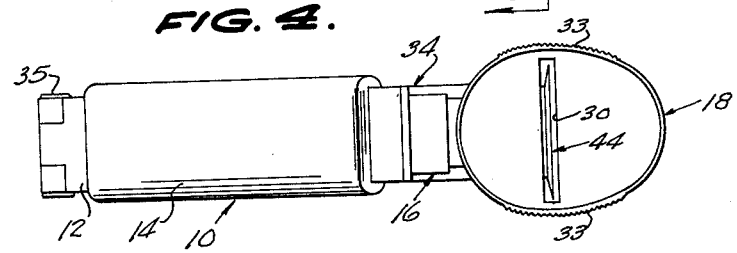
FIGURE 4 is a bottom plan view of FIGURE 2.

An inverted convex-concave, longitudinally elongated, oval egg-holder 18 is mounted on the block 16 and is positioned forwardly thereof and is disposed at the same angle to the handle 10, as the block 16, by means of a connector plate 19, which is composed of a rearwardly extending flat portion 20, which rests upon and is suitably fixed to the upper surface of the block, as by means of rivets 22; and of an upwardly and forwardly angled concave-convex portion 24 which conformably engages the upper surface at the rear end of the egg-holder 18, and is suitably fixed thereto, as by means of rivets 26. The wall of the egg-holder 18 is formed, at a location spaced from its ends, corresponding to the location of the waist 28 of an egg E, with a transverse slot 30, of a length somewhat more than 120 degrees of the circumference of the egg, so that, when, as shown in FIGURES 1 and 2, an egg is held in the hand and upwardly engaged in the egg-holder 18, with the hand also gripping the handle 10, slightly more than 120 degrees of arc of the upper part of the waist 28 of the egg is exposed by the slot 30. In order to facilitate a second grip of the user's hand on the egg-holder 18, its lower side edges can be formed with knurled portions 33.

A cutter, generally designated 32, comprises a straight flat lever bar 34, longer than the handle 10, and transversely and horizontally hinged, at its rear end, to the rear end of the handle, as indicated at 35, on an axis spaced slightly above the handle. The lever bar 34 is provided, intermediate its ends, with an upstanding operating knob 36, which is fixed upon the upper surface of the bar 34, as by means of a screw 38.

The lever bar 34 extends to and partially across the slot 30, and is provided, at its forward end, with a transversely elongated, rectangular cross section, downwardly extending blade carrier block and stop 40, which is fixed to the underside of the bar 36, as by means of screws 42. An arcuate, relatively thin, downwardly tapered blade 44 has its upper edge suitably fixed in a groove 46, in the lower forward corner of the block 40, and extends downwardly below the block 40.

The blade 44 has a sharpened lower cutting edge 48 which is arcuate, substantially conforms in curvature to the curvature of the egg waist 28, and which is 120 degrees of arc in length. The cutting edge 48 is spaced downwardly from the bottom of the block 40, at a distance of the order of three-sixteenths and one-quarter inch, so that when the blade 44 is driven downwardly through the slot 30, and the block 40 strikes the upper surface of the egg-holder 18, the top of the shell of the egg E will be cut through to a corresponding depth and to the extent of 120 degrees of its circumference.

The cutter 32 is operated from a retracted or elevated position by grasping the knob 36 with the hand other than that holding the egg E and the handle 10, and forcing the lever bar 34 downwardly with only sufficient force to drive the blade 44 through the shell of the egg.

Since the blade 44 is relatively thin and sharp, a clean cut is made in the top of the egg shell, of limited and controlled length and width, whose formation does not involve mashing or otherwise fracturing of the egg shell, which could produce spilling or escape of the contents of the egg from the shell, so that the cut egg can be temporarily laid aside for subsequent use, without danger of spilling its contents. When an egg is to be used immediately after being cut, the egg is simply allowed to move downwardly out of the egg-holder 18 and into the user's hand, and then manually split into the two equal and similar sections defined by the cut made by the blade, without spilling the contents of the sections.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. An egg-shell cutter comprising a normally horizontal handle, a longitudinally elongated oval convex-concave downwardly opening egg-holder fixed to and extending from one end of the handle, the wall of the egg-holder being formed with a transverse slot spaced from the ends of the egg-holder, a lever bar extending along and spaced above the handle, said lever bar being pivoted, at one end thereof, on the end of the handle remote from the egg-holder and reaching to said slot, a cutter blade fixed to and extending downwardly from the lever bar and adapted to enter the egg-holder slot in a depressed position of the lever bar, and stop means on the underside of the lever bar adapted to engage the upper surface of the egg-holder and limit downward movement of the cutter blade through the top of the shell of an egg held up in the egg-holder by a hand grasping the handle.

2. An egg-shell cutter comprising a normally horizontal handle, a longitudinally elongated oval convex-concave downwardly opening egg-holder fixed to and extending from one end of the handle, the wall of the egg-holder being formed with a transverse slot spaced from the ends of the egg-holder, a lever bar extending along and spaced above the handle, said lever bar being pivoted, at one end thereof, on the end of the handle remote from the egg-holder and reaching to said slot, a cutter blade fixed to and extending downwardly from the lever bar and adapted to enter the egg-holder slot in a depressed position of the lever bar, and stop means on the underside of the lever bar adapted to engage the upper surface of the egg-holder and limit downward movement of the cutter blade through the top of the shell of an egg held up in the egg-holder by a hand grasping the handle, said stop means being located at one side of and being a part of the cutter blade.

3. An egg-shell cutter comprising a normally horizontal handle, a longitudinally elongated oval convex-concave downwardly opening egg-holder fixed to and extending from one end of the handle, the wall of the egg-holder being formed with a transverse slot spaced from the ends of the egg-holder, a lever bar extending along and spaced above the handle, said lever bar being pivoted, at one end thereof, on the end of the handle remote from the egg-holder and reaching to said slot, a cutter blade fixed to and extending downwardly from the lever bar and adapted to enter the egg-holder slot in a depressed position of the lever bar, and stop means on the underside of the lever bar adapted to engage the upper surface of the egg-holder and limit downward movement of the cutter blade through the top of the shell of an egg held up in the egg-holder by a hand grasping the handle, said handle comprising an elongated straight bar.

4. An egg-shell cutter comprising a normally horizontal handle, a longitudinally elongated oval convex-concave downwardly opening egg-holder fixed to and extending from one end of the handle, the wall of the egg-holder being formed with a transverse slot spaced from the ends of the egg-holder, a lever bar extending along and spaced above the handle, said lever bar being pivoted, at one end thereof, on the end of the handle remote from the egg-holder and reaching to said slot, a cutter blade fixed to and extending downwardly from the lever bar and adapted to enter the egg-holder slot in a depressed position of the lever bar, and stop means on the underside of the lever bar adapted to engage the upper surface of the egg-holder and limit downward movement of the cutter blade through the top of the shell of an egg held up in the egg-holder by a hand grasping the handle, said handle comprising a straight bar, said egg-holder being disposed at a longitudinally outward and upward angle relative to the handle.

References Cited in the file of this patent

UNITED STATES PATENTS

| | | |
|---|---|---|
| 1,918,463 | Foster | July 18, 1933 |
| 2,509,630 | Duffy | May 30, 1950 |
| 2,696,860 | Jepson | Dec. 14, 1954 |
| 2,823,715 | Quave | Feb. 18, 1958 |
| 2,904,089 | Formis | Sept. 15, 1959 |